United States Patent
Ward

Patent Number: 6,051,177
Date of Patent: *Apr. 18, 2000

[54] THERMO-MECHANICAL MODIFICATION OF NONWOVEN WEBS

[76] Inventor: Gregory F. Ward, 407 Montrose Pkwy., Norcross, Ga. 30092-2622

[*] Notice: This patent issued on a continued prosecution application filed under 37 CFR 1.53(d), and is subject to the twenty year patent term provisions of 35 U.S.C. 154(a)(2).

[21] Appl. No.: 08/613,336

[22] Filed: Mar. 11, 1996

[51] Int. Cl.$^7$ ............................ B29C 55/06; B29C 55/08
[52] U.S. Cl. .................................... 264/288.8; 264/290.2; 264/291; 264/DIG. 73
[58] Field of Search .................. 156/229; 264/288.4, 264/291, 288.8, 292, 290.2, 210.7, DIG. 73

[56] References Cited

U.S. PATENT DOCUMENTS

| | | |
|---|---|---|
| 3,047,444 | 7/1962 | Harwood .............................. 264/290.2 |
| 4,048,364 | 9/1977 | Harding et al. . |
| 4,408,974 | 10/1983 | Comerio . |
| 5,053,066 | 10/1991 | Hassenboehler . |
| 5,244,482 | 9/1993 | Hassenboehler et al. . |
| 5,441,550 | 8/1995 | Hassenboehler et al. . |
| 5,443,606 | 8/1995 | Hassenboehler et al. . |

*Primary Examiner*—Jan H. Silbaugh
*Assistant Examiner*—Kenneth M. Jones

[57] ABSTRACT

A process for thermomechanically treating heat bonded thermoplastic and partially thermoplastic nonwoven webs while under low strain rate tension results in significant improvements to the nonwoven web's conformability, softness and impart a high degree of commercially valuable elasticity. The resultant webs find use in all nonwoven applications where softness, conformability and elasticity are useful. The process develops elasticity in only one direction but the two embodiments provide the ability to create elasticity in the machine or cross machine direction of a roll of precursor material. In addition virtually any precursor web containing at least 60% thermally bonded thermoplastic fibers can be used.

15 Claims, 2 Drawing Sheets

THERMO-MECHANICAL MODIFICATION OF NONWOVEN WEBS

BACKGROUND OF INVENTION

1. Field of Invention

This invention relates to thermally bonded nonwoven webs containing thermoplastic fibers or a mixture of thermoplastic and non-thermoplastic fibers that have been mechanically modified under specific process conditions so as to produce a finished web that is softer, less stiff, conformable and displays a significant and commercially valuable degree of elasticity. In one aspect the invention relates to nonwoven webs and laminates of nonwoven webs. In another aspect the invention relates to a method and apparatus for mechanically and thermally modifying thermally bonded nonwoven webs containing thermoplastic or a mixture of thermoplastic and non-thermoplastic fibers.

2. Status of Prior Art

Nonwoven textiles have created a large industry in response to the demand for inexpensive materials to replace woven textiles for use in disposable products in many fields. These include disposable sanitary protection products including adult and infant diapers, sanitary napkins, medical products such as masks, operating gowns, head covers, operating drapes, protective work-wear such as coveralls head covers and masks, and personal use items such as underwear.

Nonwovens, although inexpensive, have some negative aspects. They are not as strong nor as tough as traditional woven textiles. They tend to be much stiffer and less flexible than woven textiles with little or no elasticity, conformability or drapability.

The most popular nonwovens today are fabricated from webs of thermoplastic fibers. These webs may be made from mechanically laid fibers or fibers extruded directly from thermopollymers in the molten state. Regardless of the web formation method the fibrous webs thus produced have very little strength until the fibers composing the web are thermally bonded together. This is done by with heated embossed press rolls or other thermal means to join the fibers at their intersections which provides the required strength.

A major deficiency of nonwovens is their lack of elasticity or stretch, toughness, softness, and conformability. Toughness is an important factor in the durability and utility of disposable products. This is important from a utility aspect even though those products may be disposed of in a short period of time. Softness is also important especially in disposable diaper coverstock, disposable medical and industrial apparel, disposable sheets and pillow cases and any of the myriad uses of nonwovens where the nonwoven comes in contact with the skin.

The ability of a material to stretch and recover is a desirable quality in any fabric whether it be woven or nonwoven since it improves the toughness, conformability and fit of the resultant products. This property is generally called elasticity. In actual use a material only needs 30 to 50% recoverable stretch to provide adequate service in disposable apparel. As an example, disposable underwear with a 24 inch waist will only have to stretch 50% to fit over 36 inch hips.

Some of the attempts to provide stretch or elasticity and increased toughness and conformability have been to incorporate elastomerics into nonwovens. This is accomplished using films, bands, or threads of natural or synthetic rubber. Nonwoven disposable products using elastomerics are very expensive and consequently have found only limited use in the industry.

One method used to provide stretch or conformability was to crepe the fabric using various means of longitudinal mechanical compression. This provides some elongation in the direction of creping but no changes in tensile strength or toughness. A serious deficiency is that after elongation a creped material has very poor recovery characteristics. Creping also decreases the softness of the material.

U.S. Pat. No. 5,244,482 to Hassenboehter et al (1993) discloses a process which uses very high strain rates to laterally consolidate the precursor web with resultant reductions in average pore size and narrowing of the pore size distribution. Very high strain rates are required to change the morphology of the nonwoven and create the large changes in pore size. A degree of elasticity is created but the resultant fabric is stiff and the elastic modulus is low. Additionally, this patent places significant limitations on the precursor web's physical properties as to crystallinity, thermoplastic fiber content, fiber diameter, random fiber deposition, isotropic tensile properties, and low tensile elongation to break.

The very high strain rates taught in U.S. Pat. No. 5,244,482 in order to provide high lateral consolidation of the fibers results in a web with gross changes in its morphology. These changes are manifested as reduced average pore size and an increased packing density which results in significant improvements in filtration efficiency.

U.S. Pat. No. 5,244,482 does not anticipate the use of very low strain rate s and in fact places a lower limit on preferred strain rates that are 5 to 10 times higher than the present invention.

U.S. Pat. No. 5,244,482 is similar to U.S. Pat. No. 5,053,066 which also deals with post treatment of webs to change structure for filtration applications by the application of very high strain rates to a precursor thermoplastic web.

U.S. Pat. No. 4,048,364 to Harding et al (1977) discloses the use of high strain rates to increase the tensile strength of a ribbon of meltblown polypropylene fibers which in its pre-treated state must have a little or no fiber crystallinity or orientation. It is not noted whether elasticity is developed.

U.S. Pat. Nos. 5,441,550 and 5,443,606 to Hassenboehier et al (1995) disclose the same process as U.S. Pat. No. 5,244,482 but use different precursor webs.

The use of high strain rate drawing is well known and is practiced in the film industry to orient film to give increase strength and toughness. A typical stretching roll arrangement is shown in U.S. Pat. No. 4,408,974 to Comerio (1983).

Another well known example of high strain rate drawing is the drawing of thermoplastic textile fibers from the melt through a die using a series of Godet rolls wherein each successive set of pull rolls runs at consecutively higher speeds.

SUMMARY OF THE INVENTION

The web of the present invention is manufactured by elongating a nonwoven web under very low strain rates and carefully controlled thermal process conditions. This has the unexpected result of creating a high degree of elasticity within the precursor web and significant improvement in softness and conformability. This is accomplished without large changes in average pore size or pore size distribution which decrease softness and conformability.

Surprisingly, this result is not dependent on the properties of the precursor web as is the case with the prior art. The only criteria is that the precursor web be thermally bonded and contain at least 60% thermoplastic fibers with the remainder of the fibers being nonthermoplastic. The process works with meltblown, spunbond, and carded thermally bonded nonwovens as well as with laminates containing two or more of those aforementioned nonwovens and laminates of the aforementioned nonwovens and thermoplastic films.

The method of the present invention involves subjecting a thermally bonded nonwoven web containing at least 60% thermoplastic fibers to elongating forces at a carefully controlled low strain rate while the web is at a temperature of no more than 70 degrees F above its plastic point. The low strain rate elongation may be carried out in either the machine direction or the cross-machine direction using any of the precursor webs indicated above. The resultant web displays a surprisingly high and commercially valuable degree of elasticity. The resultant web is softer, less stiff and displays improved web toughness compared to the precursor web. The elasticity is developed in a direction perpendicular to the direction of elongation. In both the machine direction and the cross machine direction cases a high degree of elasticity is developed using anisotropic precursor webs and a strain rate of less than 9.5 in./in./min. Both of these characteristics further distinguish this invention over U.S. Pat. No. 5,244,482.

OBJECTS AND ADVANTAGES

Accordingly, besides the objects and advantages of the process and web described in our above patent, several objects and advantages of the present invention are:

(a) provide a process which produces soft, conformable elastic nonwoven materials which can overcome many of the objections to the use of nonwovens in disposable apparel and other products where the material comes into contact with the user's skin.

(b) provide a process which produces soft, conformable and elastic nonwoven web materials at high rates of speed to make this post production process economical and commercially viable.

(c) provide a process that is very versatile in the choice of precursor webs.

BRIEF DESCRIPTION OF THE DRAWINGS

For a better understanding of the invention, as veil as other objects and features thereof, reference is made to the accompanying drawings wherein.

DESCRIPTION

As described above the invention relates to the post-treatment of a precursor web to increase softness, conformability and provide a significant and commercially valuable degree of elasticity which is manifested in the cross machine direction or the machine direction depending on the direction of web drawing.

Figure 1:
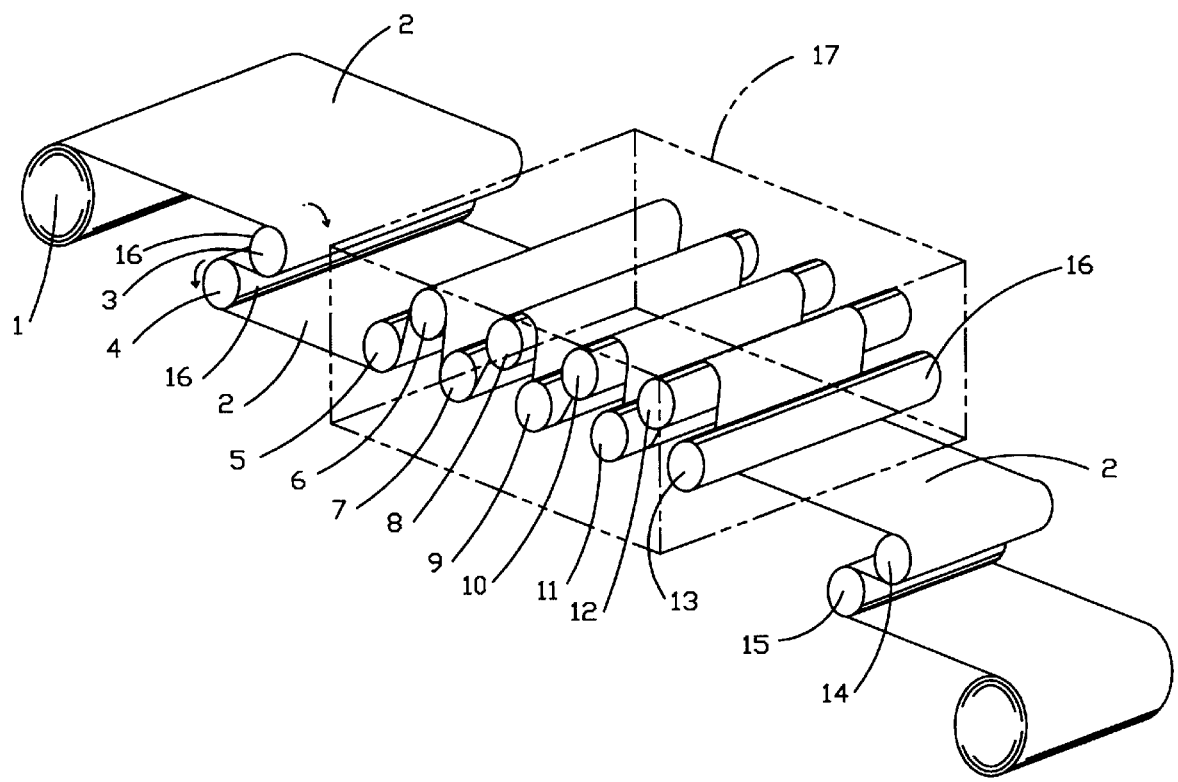
FIG. 1 shows the arrangement of rolls and thermal environment for providing a machine direction strain to the web resulting in cross machine direction elasticity.
Figure 2:
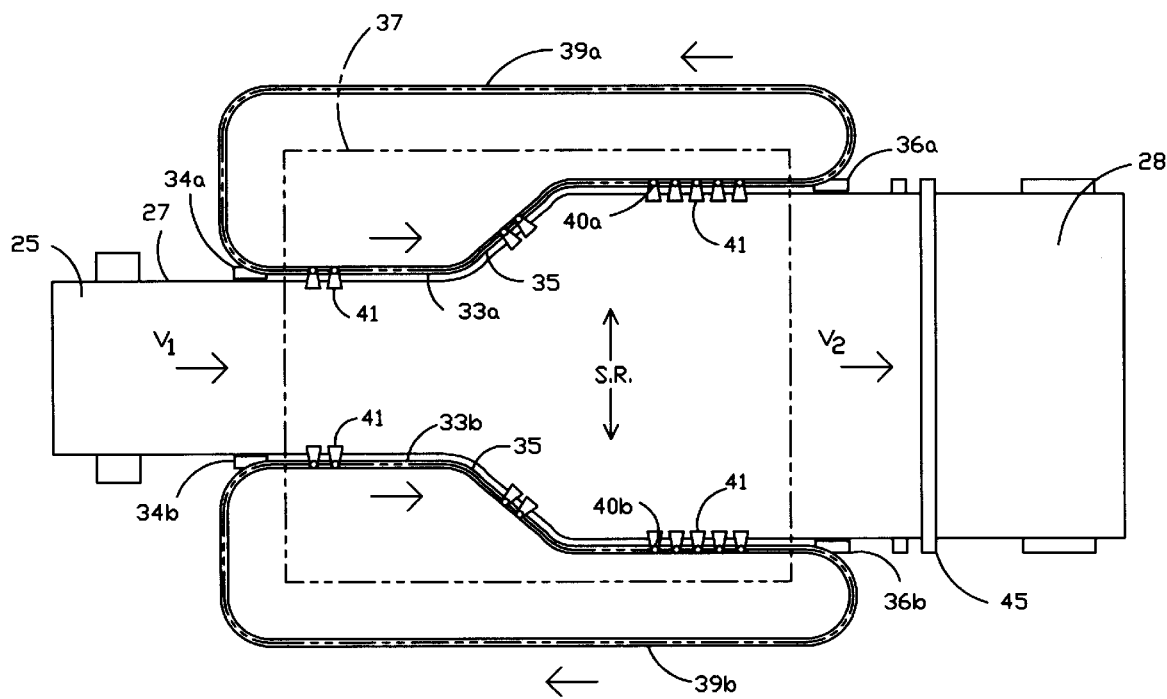
FIG. 2 shows the arrangement of components to provide cross machine direction strain to the web resulting in machine direction elasticity

An embodiment for carrying out the preferred process to develop cross machine direction elasticity is illustrated schematically in FIG. 1 wherein the precursor web 2 is unwound from master web roll 1 and is fed through a series of rotating rolls 3 through 15 each having a rubber or other surface coating 16 that provides a high coefficient of friction contained within a thermally controlled environment or oven 17 and is then wound up on winder roll 9. Each succeeding roll in the series of rolls 5 to 13 has a higher rotational velocity than the preceding roll. The absolute velocity of each roll depends on the number of rolls and the tangential distance between rolls so that the cumulative strain rate for all rolls is less than 9.5 in./in./min. The speed and differential speed are controlled by appropriate gearing or individual variable speed motors. The tangential distance between each roll in the series is determined such that the total or cumulative strain rate for the series of rolls shall be no greater than 9 in/in/min. regardless of the number of rolls. The strain rate is calculated using the formula: strain rate=$(\Delta L/L) \times 1/t$ where $\Delta L$ is the increase in length between rolls, L is the tangential length between rolls and t is the time for a point on the web to traverse from one roll to the next roll. The thermal environment or oven 10 is maintained at a temperature at or no more than 70° F. above the precursor web's plastic point which is described below. The elongation of the web 17 under the specified process conditions causes the web to decrease in width as the web increases in length. An increase in the basis weight is noted compared to the precursor web. The resultant web displays cross machine direction elasticity Alternative Embodiments An alternative embodiment for carrying out the preferred process to develop machine direction elasticity is illustrated schematically in FIG. 2 In the previous description the web is drawn longitudinally to develop cross direction elasticity. In this embodiment the web is stretched laterally to develop machine direction elasticity.

The apparatus for carrying out a preferred process of cross machine direction strain consists of an oven or other thermally controlled environment which houses a set of two opposed and continuous slots 33a, 33b which initially run parallel to the machine direction of the apparatus. At the design point within the oven where the web reaches its plastic point the path of each slot begins to diverge laterally and outward from the center line of the apparatus with each slot following a specially designed arcuate curve until the distance between the slots equals the desired degree of stretching. This is typically 40% or less draw. At this point each slot has curved back to a direction parallel with the machine direction. The path of each slot then curves around and out of the oven and returns in the anti-machine direction 39 to the entrance of the apparatus where it joins the beginning of the slot. Each slot houses an endless chain 40a, 40b which in turn drives a multiplicity of commercially available fabric clamps 41. The chains are driven by a single variable speed motor through a speed reducing transmission.

The shape of the slot's curve 35 is extremely important and designed such that the cross direction velocity vector components increase at the proper rate in order to achieve the desired cross direction strain rate. Simultaneously the machine direction velocity vector components must decrease to achieve the desired machine direction relaxation. If the arcuate curve and its velocity vector components are not correctly designed and the web cannot be relaxed in the machine direction the drawing effect will be biaxial instead of uni-axial and little or no elasticity will be developed. The strain rate is calculated using the formula: strain rate=$(\Delta L/L) \times 1/t$ where $\Delta L$ is the increase in the web's width between gripping clamps, L is the increase in the width of the web after traversing the tension device and t is the time for the web to be drawn $\Delta L$.

Using the above described apparatus the precursor web 27 is unwound from master web roll 25 and enters the cross machine direction tension section which is housed within the thermally controlled environment or oven 37. The web is aligned between two longitudinal slots 33a, 33b which define the path of the longitudinal edges of the web. Upon entering the cross machine direction tension section the web is gripped on each parallel side by an opposed set of commercially available fabric clamps 40a, 40b which are actuated by the clamp setting cams 34a, 34b. As the chain moves forward the next set of opposed clamps are activated by the clamp setting cam. This sequence is repeated as the chain and the web move forward into the web heating environment. Initially the slots runs parallel to the machine direction in order to provide time for the web to reach the plastic point at which time it is ready to be drawn. At the point where the web has reached a temperature preferably no more than 70° F. above the plastic point the slots begin to diverge outwardly from the longitudinal direction with each slot following the specially designed curve until the distance between the slots equals the degree of stretching required. The web which is held by the fabric clamps continuously along each opposed longitudinal edge is thus stretched at the required strain rate of less than 9.0 inches per inch per minute and develops elasticity, softness and conformability. After the tension step is completed the web exits the oven where it is cooled by ambient air or by forced cooling air. After the temperature of the web is reduced to at least 50° F. below the plastic point the fabric clamps 40a, 40b are released by the release cams 36a, 36b and the web is rotted up on the winder roll 28. The speed of the winder roll is controlled by a tension monitoring device such as a dancer roll 45 in order to prevent the web material stretching before it is rolled up.

Terminology

The following definitions, which are consistent with accepted industry and technical definitions, are given in order to better understand the preferred embodiments and the descriptions of the process and experiments below.

Web elasticity: The property of a material's structure or morphology that permits it to be elongated up to 200% and when the elongating stresses are removed it will recover at least 85% of its original dimensions within a few minutes.

Plastic point: The plastic point was defined for our experiments as the temperature at which a sample nonwoven web will elongate more than 40% in 5 seconds when subjected to a stress equal to 10% of its normal tensile strength at break.

Strain rate: Strain is the physical change in dimension of a body which has been subjected to a stress. Classically, strain rate is the rate at which a body is elongated in a single direction. It is typically measured in inches of strain per inch of length of the body being strained per minute. It can also be expressed as a percentage.

In ATM Test Method D-638 at A 2.13 strain rate is described as equal to the rate of cross head movement divided by the initial distance between the cross heads. In this case the cross heads referred to are the jaws which grip the material being subjected to the force or stress. For this test the strain rate thus calculated is accurate as long there is no substantial change in cross sectional area.

Strain rate is mathematically described as:

$$\text{strain rate} = \frac{(L_2 - L_1)}{L_1} \times \frac{1}{t}$$

where $L_1$ equals the original gauge length, $L_2$ equals the stretched length and t equals the time to stretch the material.

Experimental Data

A series of experiments were run on a variety of webs to evaluate the elasticity softness and conformability of the webs after thermomechanically treatment. Webs were used without a pre selection process to reject webs that had anisotropic physical properties, greater than 40% room temperature elongation, or other specific physical, morphological and chemical properties as required by prior art taught by U.S. Pat. No. 5,244,482.

The test runs included spunbond, meltblown, carded and thermally bonded, and laminated webs. Fiber types included polypropylene, polyester and nylon. A laminate of spunbond and polyurethane foam was also included. These materials were drawn in the machine direction and were characterized by the development of cross direction stretch.

Materials were thermomechanically modified at temperatures ranging from 40 to 50° F. Above their individual plastic point using product line speeds over 400 feet per minute with excellent product characteristics of softness, conformability, and a high degree of elasticity.

All samples were tested for elasticity by measuring the recovery of a 10 cm sample after it had been stretched to 15 cm or 50% elongation. The recovery was measured after 10 seconds and 5 minutes. All samples had a recovery of greater than 85% after 10 seconds and greater than 90% after 5 minutes. The results are shown in Table Table 1.

TABLE 1

Elastic Recovery After 50% Elongation

| Sample | Web Type | Fiber Type | Basis Weight GM/Sq. M | Recovery 10 seconds (%) | Recovery 5 minutes (%) |
|---|---|---|---|---|---|
| 1 | MB | 100% PP | 60 | 90 | 96 |
| 2 | TB | 70% PP/30% Rayon | 30 | 86 | 91 |
| 3 | SB | 100% PP | 30 | 92 | 94 |
| 4 | SB | 100% Nylon | 45 | 90 | 97 |
| 5 | SB | 100% PP | 100 | 88 | 90 |
| 6 | SB | 100% PET | 24 | 93 | 95 |
| 7 | MB | 100% PET | 75 | 92 | 94 |
| 8 | TB | 65% PET/35% Rayon | 24 | 88 | 93 |
| 9 | SB | 100% PP | 18 | 91 | 93 |
| 10 | SB/PU | 100% PP/100% PU Film | 32 | 97 | 99 |

SB = Spunbond, MB = Meltblown, TB = Carded and Thermally Bonded
PU = Polyurethane film, PP = Polypropylene, PET = Polyester Softness is a very difficult characteristic to measure. The textile industry usually tests for softness by subjective methods using human panelists. In this case the samples from table 1 were evaluated for softness by a five member panel using a standard blind sample test. Samples of the precursor and web were individually evaluated on a scale of 1 where 10 was soft and 1 was abrasive. Samples were not identified except by a code number and there was no identification of which samples were processed or precursor samples. There was a significant improvement in all samples. These results own in Table 2.

TABLE 2

Softness Before And After Processing
Blind Panel Testing Using A Scale Of 1 To 10

| Sample | Web Type | Fiber Type | Basis Weight GM/Sq. M | Softness Before | Softness After |
|---|---|---|---|---|---|
| 1 | MB | 100% PP | 60 | 4 | 6 |
| 2 | TB | 70% PP/30% Rayon | 30 | 7 | 8 |
| 3 | SB | 100% PP | 30 | 6 | 8 |
| 4 | SB | 100% Nylon | 45 | 2 | 5 |
| 5 | SB | 100% PP | 100 | 1 | 4 |
| 6 | SB | 100% PET | 24 | 5 | 8 |
| 7 | MB | 100% PET | 75 | 2 | 5 |
| 8 | TB | 65% PET/35% Rayon | 24 | 7 | 9 |
| 9 | SB | 100% PP | 18 | 6 | 8 |
| 10 | SB/PU | 100% PP/100% PU Film | 32 | 5 | 6 |

SB = Spunbond, MB = Meltblown, TB = Carded and Thermally Bonded
PU = Polyurethane film, PP = Polypropylene, PET = Polyester During test runs for cross direction elasticity it was noted that the decrease in the web width after drawing was a good guide to the development of optimum elasticity. It was found that the decrease in web width should be between This data is shown in Table 3.

TABLE 3

Reduction In Web Width At Optimum Sample Processing Conditions

| Sample | Web Type | Fiber Type | Basis Weight GM/Sq. M | Web Width Before CM | Web Width After CM | Reduction % |
|---|---|---|---|---|---|---|
| 1 | MB | 100% PP | 60 | 70 | 45.5 | 35 |
| 2 | TB | 70% PP/30% Rayon | 30 | 70 | 46.9 | 33 |
| 3 | SB | 100% PP | 30 | 50 | 32 | 36 |
| 4 | SB | 100% Nylon | 45 | 50 | 35 | 30 |
| 5 | SB | 100% PP | 100 | 50 | 32.5 | 35 |
| 6 | SB | 100% PET | 24 | 50 | 30.5 | 39 |
| 7 | MB | 100% PET | 75 | 50 | 35 | 30 |
| 8 | TB | 65% PET/35% Rayon | 24 | 70 | 42 | 40 |
| 9 | SB | 100% PP | 18 | 50 | 31 | 38 |
| 10 | SB/PU | 100% PP/PU Film | 32 | 50 | 32 | 36 |

Extremely high increases in filtration efficiency are noted in prior art U.S. Pat. No. 5,244,482 because of significant reduction in pore size and pore size distribution. This phenomena appears to be related to the very high strain rates taught by U.S. Pat. No. 5,244,482 and the subsequent severe plastic deformation and morphological alterations. Filtration tests were performed on the samples from the previous examples. The results of these tests indicate little or no improvement in filtration efficiency. This further distinguishes the present invention from U.S. Pat. No. 5,244,482.

TABLE 4

Change in Liquid Filtration Efficiency Before And After Thermomechanical Processing

| Sample | Web Type | Fiber Type | Basis Weight GM/Sq M | Filt. Eff. Before % | Filt. Eff. After % |
|---|---|---|---|---|---|
| 1 | MB | 100% PP | 60 | 85 | 85 |
| 2 | TB | 70% PP/30% Rayon | 30 | 35 | 36 |
| 3 | SB | 100% PP | 30 | 33 | 33 |
| 4 | SB | 100% Nylon | 45 | 41 | 43 |
| 5 | SB | 100% PP | 100 | 37 | 37 |
| 6 | SB | 100% PET | 24 | 33 | 3 |
| 7 | MB | 100% PET | 75 | 81 | 81 |
| 8 | TB | 65% PET/35% Rayon | 24 | 35 | 37 |
| 9 | SB | 100% PP | 18 | 18 | 18 |
| 10 | SB/PU | 100% PP/100% PU Film | 32 | N/A | N/A |

SB = Spunbond, MB = Meltblown, TB = Carded and Thermally Bonded
PU = Polyurethane film, PP = Polypropylene, PET = Polyester Alternative Embodiments The test runs to develop machine direction stretch included spunbond, meltblown, carded and thermally bonded and laminated webs. Fiber types included polypropylene, polyester and nylon. A laminate of spunbond and polyurethane foam was also included. These materials were drawn in the cross machine direction and were characterized by the development of machine direction stretch.

Materials were thermomechanically modified at product line speeds over 250 feet per minute with excellent product characteristics of softness, conformability, and a high degree of elasticity.

All samples were tested for elasticity by measuring the recovery of a 10 cm sample after it had been stretched to 15 cm or 50% elongation. The recovery was measured after 10 seconds and 5 minutes. All samples had a recovery of greater than 85% after 10 seconds and greater than 90% after 5 minutes. The results are shown in Table 5.

TABLE 5

Elastic Recovery After 50% Elongation
Machine Direction Elasticity

| Sample | Web Type | Fiber Type | Basis Weight GM/Sq M | Recovery 10 seconds (%) | Recovery 5 minutes (%) |
|---|---|---|---|---|---|
| 1 | MB | 100% PP | 60 | 91 | 93 |
| 2 | TB | 70% PP/30% Rayon | 30 | 87 | 90 |
| 3 | SB | 100% PP | 30 | 89 | 91 |
| 6 | SB | 100% PET | 24 | 91 | 94 |
| 9 | SB | 100% PP | 18 | 89 | 92 |

SB = Spunbond, MB = Meltblown, TB = Carded and Thermally Bonded
PP = Polypropylene, PET = Polyester

SUMMARY

Accordingly, the data show that this invention and the nonwoven webs thus produced create a unique nonwoven fabric with distinct properties that improve its performance in many applications requiring high elasticity, improved softness, and conformability. Furthermore, this invention, thermomechanical web modification, done at lowstrain rates has the additional advantages in that it permits the use of materials that are harsh to the touch in applications that touch the skin it allows the replacement of higher cost, softer nonwovens to reduce costs to the manufacturer and consumer of disposable products.

it improves the conformability and stretch of disposable garments thereby reducing the amount of material needed per garment when non stretchable and non conformable products are used.

because the low strain rate system works with nonwovens containing a significant percentage of cellulosic non-thermoplastic fibers disposable garments can be made that are also breatheable which permits the exchange of water vapor resulting in improved wearer comfort.

Although the above descriptions contain specific applications, these should not be construed as limiting the scope of the invention but as merely providing illustrations of some of the embodiments of this invention.

We claim:

1. A process for manufacturing a nonwoven web comprising a blend of thermoplastic and non-thermoplastic fibers having elastic properties in a cross machine direction consisting essentially of:

(a) unwinding a thermally bonded nonwoven web into a first variable tension means which feeds said web into a web heating means at a temperature no more than 70° F. Above the plastic point of said precursor web, and (b) continuously stretching the heated web lengthwise in the machine direction within said web heating means by a second variable tension means sufficient to provide a cumulative strain rate of at least 3.5 inches/inch/minute but less than 9.5 inches/inch/minute, said strain rate calculated based on the gauge length between individual elements of said tension means, whereby said web is narrowed in the crossmachine direction and lengthened in the machine direction, which is its longitudinal or lengthwise dimension, and wherein said web develops an elasticity of at least 80% recovery after being elongated at least 50% in the direction perpendicular to and in the same plane as said tension means, and is characterized by improved softness compared to the precursor web, improved conformability compared to said precursor web, an increase in basis weight of at least 5% compared to said precursor web, and a decrease of maximum pore size of no more than 20% compared to said precursor web, and (c) cooling the web and collecting the cooled web on a winder.

2. The process of claim 1 where said thermally bonded nonwoven web is a spunbonded web.

3. The process of claim 1 where said thermally bonded nonwoven web is a melt blown web.

4. The process of claim 1 where said thermally bonded nonwoven web is a blend of thermoplastic fibers and cellulosic fibers wherein said web contains at least 60% thermoplastic fibers.

5. The process of claim 1 where the tension means are at least two rotating draw rolls covered with a high friction means wherein the speed of each succeeding roll is increased such that its speed and the distance between the rolls is sufficient to provide a total strain rate of more than 3.5 inches/inch/minute and less than 9.5 inches/inch/minute.

6. The process of claim 5 wherein the number of tension means is at least 4 and no more than 20.

7. The process of claim 1 wherein the tension means are located within the heating means.

8. The process of claim 1 wherein the tension means are located exterior to the heating means.

9. A process for manufacturing a nonwoven web comprising a blend of thermoplastic and non-thermoplastic fibers having elastic properties in a machine direction consisting essentially of:

(a) unwinding a thermally bonded nonwoven web into a first variable tension means which feeds said web into a web heating means at a temperature no more than 70° F. Above the plastic point of said web, and (b) continuously drawing the heated precursor web through the heating means using second variable tension means, within said web heating means, which draws said web in the cross-machine direction of the web sufficient to provide a cumulative strain rate of at least 3.5 inches/inch/minute but less than 9.5 inches/inch/minute, said strain rate calculated based on the change in web width, (c) simultaneously reducing the machine direction speed of the web at a rate proportional to the increase in web width, whereby the width of said web is increased and the web is shortened in the machine-direction length and wherein said web develops an elasticity of at least 80% recovery after being elongated at least 50% in the direction perpendicular to and in the same plane as the drawing forces, improved softness, an increase in basis weight of at least 5%, and a decrease of maximum pore size of no more than 20%, and (d) cooling the web and collecting the cooled web on a winder.

10. The process of claim 9 where said thermally bonded nonwoven web is a spunbonded web.

11. The process of claim 9 where said thermally bonded nonwoven web is a melt blown web.

12. The process of claim 9 where said thermally bonded nonwoven web is a blend of thermoplastic fibers and cellulosic fibers wherein said web contains at least 60% thermoplastic fibers.

13. The process of claim 9 where the tension means are at least two rotating draw rolls covered with a high friction means wherein the speed of each succeeding roll is increased such that its speed and the distance between the rolls is sufficient to provide a total strain rate of more than 3.5 inches/inch/minute and less than 8.5 inches/inch/minute.

14. The process of claim 9 wherein the tension means are located within the heating means.

15. The process of claim 9 wherein the tension means are located exterior to the heating means.

* * * * *